United States Patent [19]
Alexandratos et al.

[11] Patent Number: 6,059,975
[45] Date of Patent: May 9, 2000

[54] BIFUNCTIONAL ANION-EXCHANGE RESINS WITH IMPROVED SELECTIVITY AND EXCHANGE KINETICS

[75] Inventors: Spiro D. Alexandratos; Gilbert M. Brown; Peter V. Bonnesen, all of Knoxville; Bruce A. Moyer, Oak Ridge, all of Tenn.

[73] Assignee: Lockheed Martin Energy Research Corporation, Oak Ridge, Tenn.

[21] Appl. No.: 08/922,198

[22] Filed: Sep. 2, 1997

[51] Int. Cl.[7] ......................................................... C02F 1/42
[52] U.S. Cl. ........................... 210/683; 210/682; 521/27; 521/30; 521/32; 521/34; 525/381
[58] Field of Search .................................. 521/34, 32, 30, 521/27; 525/381; 210/682, 683

[56] References Cited

U.S. PATENT DOCUMENTS

| | | |
|---|---|---|
| 2,591,573 | 4/1952 | McBurney . |
| 2,632,001 | 3/1953 | McMaster et al. . |
| 2,725,361 | 11/1955 | Hwa . |
| 2,801,224 | 7/1957 | Greer . |
| 4,785,020 | 11/1988 | Boom ........................................ 521/32 |
| 5,141,965 | 8/1992 | Pike . |

OTHER PUBLICATIONS

K.R. Ashley, et al., "Sorption Behavior of Pertechnetate on Reillex™–HPQ Anion Exchange Resin from Nitric Acid Solution", *Solv. Ext. Ion Exch.* 12 (2) :239–259, 1994.

K.R. Ashley, et al., "Breakthrough Volumes of $TcO_4^-$ on Reillex™–HPQ Anion Exchange Resin in a Hanford Double Shell Tank Simulant", *J. Radioanal. Nucl. Chem. Art.* 194(1):71–79, 1995.

R.E. Barron and J.S. Fritz, "Effect of Functional Group Structure on the Selectivity of Low–capacity Anion Exchangers for Monovalent Anions", *J. Chrom.* 284:13–25, 1984.

G.D. Del Cul, et al., "Technetium–99 Removal from Process Solutions and Contaminated Groundwater", *Sep. Sci. Tech.* 28 (1–3) :551–564, 1993.

M. Kawasaki, et al., "Adsorption of Pertechnetate on an Anion Exchange Resin", *Radiochimica Acta* 63:53–56, 1993.

N.C. Schroeder, et al., "Techneteium Partitioning for the Hanford Tank Waste Remediation System: Sorption of Technetium from DSS and DSSF-7 Waste Simulants Using Reillex™–HPQ Resin", Los Almos National Laboratory, Chemical Science and Technology Division, Nuclear and Radiochemistry Group, pp. 1–69, 1995.

*Primary Examiner*—Fred Zitomer
*Attorney, Agent, or Firm*—Quarles & Brady LLP

[57] ABSTRACT

Disclosed herein are a class of anion exchange resins containing two different exchange sites with improved selectivity and sorptive capability for chemical species in solution, such as heptavalent technetium (as pertechnetate anion, $TcO_4^-$). The resins are prepared by first reacting haloalkylated crosslinked copolymer beads with a large tertiary amine in a solvent in which the resin beads can swell, followed by reaction with a second, smaller, tertiary amine to more fully complete the functionalization of the resin. The resins have enhanced selectivity, capacity, and exchange kinetics.

38 Claims, 2 Drawing Sheets

BIFUNCTIONAL ANION-EXCHANGE RESINS WITH IMPROVED SELECTIVITY AND EXCHANGE KINETICS

CROSS-REFERENCE TO RELATED APPLICATIONS

Not applicable.

STATEMENT REGARDING FEDERALLY SPONSORED RESEARCH

This invention was made with United States Government support awarded by the Department of Energy to Lockheed Martin Energy Research Corporation, Contract No. DE-AC05-96OR22464. The United States Government has certain rights in this invention.

BACKGROUND OF THE INVENTION

1. Field of the Invention

This invention relates generally to anion exchange resins. More particularly, it relates to a class of anion exchange resins containing two different exchange sites with improved selectivity, sorptive capacity, and exchange kinetics.

2. Background of the Art

Groundwater contamination can be the result of, for example, solutions contaminated with radioactive metal ions leaking out of lagoons and burial pits. At Paducah, Ky. a plume has apparently seeped through the clay of the vadose zone into the sandy aquifer below. Under the oxidizing conditions in near-surface groundwaters, the principal form of the element Tc is the $TcO_4^-$ anion (Pourbaix, M., *Atlas of Electrochemical Equilibria,* p. 24, Pergamon Press, Oxford, 1966), and it is water soluble and quite mobile in underground aquifers. The mobility of this species when coupled with a long half-life of 213,000 years makes the presence of pertechnetate in groundwater an environmental concern. A related problem exists at other sites where materials used in the processing of uranium or plutonium have apparently leaked out of containers into the ground.

Commercially available anion exchange resins are capable of removing $TcO_4^-$ ion in the presence of typical anions found in groundwater (see for example Del Cul, G. D., et al., *Sep. Sci. and Tech.* 28:551, 1993). Further examples of anion exchange resins are disclosed in U.S. Pat. Nos. 2,591,573; 2,632,001; 2,725,361; 2,801,224; and 5,141,965. However, improved selectivity is desirable and can result in substantial cost savings. The pertechnetate anion has a high affinity for strong base anion exchange resins such as those made from quaternary amines. Thus, a resin with both a high selectivity for technetium as pertechnetate anion ($TcO_4^-$) over other anions commonly encountered in groundwater aquifers (e.g., chloride, nitrate, and sulfate), and a high anion exchange capacity is desired for efficient removal of pertechnetate from contaminated groundwater aquifers.

Some of the physical properties of a resin that are known to enhance selectivity for less hydrated anions such as pertechnetate (or iodide, perchlorate, or perrhenate) over other more hydrated anions such as nitrate include increasing the hydrophobicity and steric bulk of the alkyl groups surrounding the anion exchange site. Such a trend has been noted in for example, a paper by R. E. Barron and J. S. Fritz (*Journal of Chromatography* 284:13–25, 1984). However, increasing the alkyl chain length (and steric congestion) surrounding the anion exchange site results in a concomitant decrease in the ease of ion transport within the resin. Thus, the rate of exchange decreases (i.e., it requires longer times for the resin to come to equilibrium with the solution it is exposed to). The use of bulky amines also results in a lower degree of functionalization, as the increased steric congestion prevents all of the available resin sites from reacting with the amine. In fact, the total anion exchange capacity decreases with the increasing size of the trialkyl amine. Thus, a need exists for an anion exchange resin with high selectivity, high exchange capacity, and enhanced exchange kinetics.

To balance and optimize the competing properties of large, bulky tertiary amines (an increased pertechnetate selectivity versus a decreased rate of exchange and a decreased total anion exchange capacity), we have invented a class of resins which contain a mixture of both small and large amines. These resins having anion exchange sites composed of two separate and differently-sized amines possess higher sorptive capacities in a given amount of time for pertechnetate over resins possessing exchange sites derived from only one tertiary amine. The new materials improve on the problem of high selectivity but poor exchange capacity and kinetics characteristic of resins containing only one type of exchange site.

BRIEF SUMMARY OF THE INVENTION

We have invented a new class of anion exchange resins which, compared to currently available anion exchange resins, are superior for the selective sorption of chemical species that are in solution. In particular, these novel resins have a surprisingly and an unexpectedly high distribution coefficient for pertechnetate ions and very favorable uptake kinetics.

One aspect of the invention provides a process of preparing bifunctional anion-exchange resins comprising the steps of: reacting haloalkylated, cross-linked copolymer beads with a first tertiary amine under conditions and in an amount sufficient to substitute at least a portion of the haloalkylated sites and obtain partially functionalized copolymer beads, wherein the first tertiary amine has higher alkyl moieties; and reacting the partially functionalized copolymer beads with a second tertiary amine under conditions and in an amount sufficient to functionalize at least a portion of the remaining haloalkylated sites, wherein the second tertiary amine has lower alkyl moieties.

Preferably, the first tertiary amine corresponds to the formula $NR_1R_2R_3$ and the second tertiary amine corresponds to the formula $NR_4R_5R_6$, where $R_1$, $R_2$, and $R_3$ are independently selected from alkyl moieties having 5 or more carbons and $R_4$, $R_5$, and $R_6$ are independently selected from alkyl moieties having 1 to 4 carbons. It is preferred that the first tertiary amine be selected from the group consisting of tri-n-pentylamine, tri-n-hexylamine, tri-n-heptylamine, and tri (isooctyl) amine, and that the second tertiary amine be selected from the group consisting of trimethyl, triethyl, tri-n-propyl, tri-n-butyl amine, and tri (isobutyl) amine. It is more preferred that the first tertiary amine be selected from the group consisting of tri-n-pentyl amine and tri-n-hexyl amine, and that the second tertiary amine be selected from the group consisting of triethyl amine, tri-n-propyl amine, tri-n-butyl amine, and tri (isobutyl) amine. It is most preferred that the first tertiary amine be tri-n-hexyl amine, and that the second tertiary amine be selected from the group consisting of triethyl amine and tri-n-propyl amine.

The cross-linked polymer beads need to contain haloalkylated sites capable of reacting with a tertiary amine to form the tetra-alkylammonium (strong base) anion exchange site.

It is preferred that the haloalkyl moiety be chloromethyl. The haloalkylated site in the cross-linked polymer beads can be prepared either by copolymerization of a haloalkylated monovinyl aromatic monomer such as vinyl-benzyl chloride with a cross-linking monomer such as divinyl benzene (preferred), or by haloalkylating cross-linked polystyrene/divinyl benzene copolymer beads. Chloromethylation using chloromethylmethyl ether is the preferred method of haloalkylating cross-linked polystyrene/divinyl benzene copolymer beads. The copolymer beads can be macroporous or a gel, though macroporous is preferred.

Preferably, the copolymer beads comprise from about 90 to about 97 weight percent of a monovinyl aromatic monomer (styrene or vinyl-benzyl chloride), and from about 3 to about 10 weight percent of a cross-linking monomer based on the weight of the monomers. Most preferably, the monovinyl aromatic monomer is vinyl-benzyl chloride and the cross-linking monomer is divinyl benzene.

The cross-linked polymer beads can be pre-treated or reacted in a solvent capable of swelling the beads such as 1,4-dioxane or ethylene dichloride, though pre-treatment is not a necessary condition for the tertiary amine to react with the haloalkylated copolymer.

Generally, it is preferred that the degree of functionalization (anion-exchange capacity) in milliequivalents per gram (meq/g) dry weight of resin for the first (larger) tertiary amine be in the range of about 0.3 to about 1.8 meq/g, and for the second (smaller) tertiary amine be in the range of about 0.3 to about 3.0 meq/g. For the more preferred combination of large amines selected from the group tri-n-pentyl amine and tri-n-hexyl amine with small amines selected from the group triethyl amine, tri-n-propyl amine, tri-n-butyl amine, and tri (isobutyl) amine, the preferred degree of functionalization should be in the range of about 0.7 to about 1.3 meq/g for the larger tertiary amine, and about 0.7 to about 2.5 meq/g for the smaller tertiary amine. For the most preferred combination of tri-n-hexyl amine as the first tertiary amine with the second tertiary amine selected from the group of triethyl amine and tri-n-propyl amine, the preferred degree of functionalization should be in the range of about 0.8 to about 1.2 meq/g for tri-n-hexyl amine, and about 1.0 to about 2.3 meq/g for the second amine.

Another aspect of the present invention provides a bifunctional anion-exchange resin comprising haloalkylated, cross-linked polymer beads in which a first tertiary amine having higher alkyl moieties is substituted at haloalkylated sites which are most accessible to said first amine and in which a second tertiary amine having lower alkyl moieties is substituted at haloalkylated sites which are least accessible to said first amine. Preferably, the first tertiary amine corresponds to the formula $NR_1R_2R_3$ and the second tertiary amine corresponds to the formula $NR_4R_5R_6$, where $R_1$, $R_2$, and $R_3$ are independently selected from alkyl moieties having 5 or more carbons and $R_4$, $R_5$, and $R_6$ are independently selected from alkyl moieties having 1 to 4 carbons. It is also advantageous that the bifunctional anion-exchange resin have the properties noted above regarding the process of the present invention.

A still further aspect of the invention provides a process for separating chemical species from a liquid which contains the chemical species in solution comprising the steps of: contacting the liquid with resins of the above kind such that the chemical species are retained thereby; and eluting the chemical species from the resin with a regenerating agent. The chemical species can be pertechnetate ions.

The objects of the invention, therefore, include providing resins of the above kind, and processes of making and using them:

(a) which have high selectivity and favorable reaction kinetics;

(b) which realize substantial cost savings in treating contaminated liquids; and (c) which solve the problems of high selectivity but poor exchange capacity and poor kinetics characteristic of resins containing only one type of exchange site.

These and still other objects and advantages of the present invention will be apparent from the description below. However, this description is only of the preferred embodiments. The claims should, therefore, be looked to in order to assess the whole scope of the invention.

DETAILED DESCRIPTION OF THE INVENTION

Figure 1:
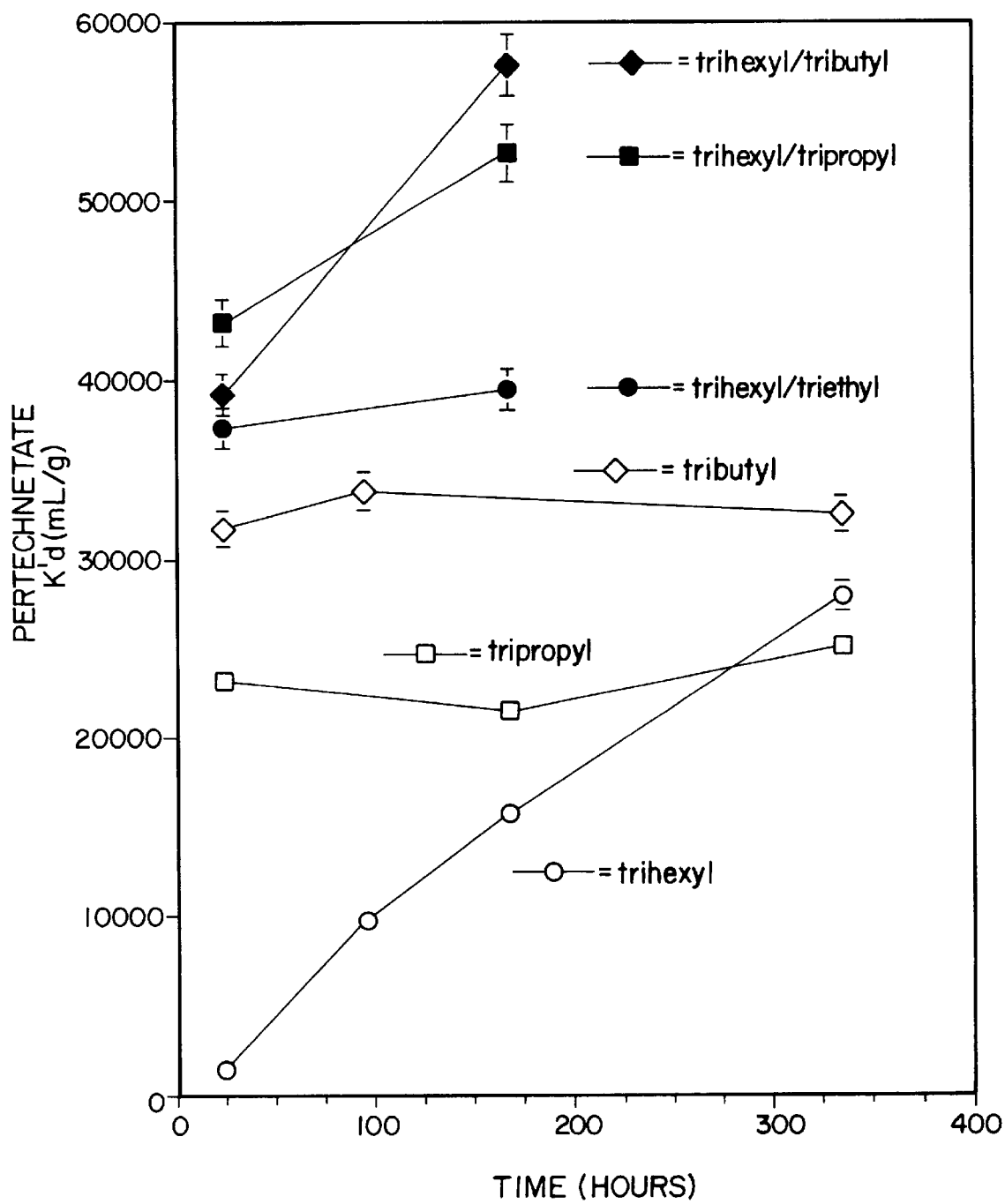
FIG. 1 shows technetium distribution $K'_d$ (mL/g) for bifunctional resins and monofunctional resins as a function of time (uncertainty is ±3%)

The anion exchange resins disclosed are prepared by functionalizing copolymer beads with two different tertiary amines so as to improve the selectivity, capacity, and exchange kinetics for chemical species in solutions, such as pertechnetate anions. During functionalization, a first tertiary amine having higher alkyl moieties is substituted onto the copolymer at haloalkylated sites which are most accessible to diffusion, while a second tertiary amine having lower alkyl moieties is substituted at haloalkylated sites which are least accessible to diffusion.

Due to the nearly quantitative nature of amination reactions, partial functionalization is preferably achieved by reacting the haloalkylated copolymer beads with the first tertiary amine to the maximum extent obtainable, which leaves unreacted those haloalkylated sites which are least accessible to diffusion. The resulting partially aminated resin beads may then be aminated with the second tertiary amine so as to substitute at least a portion of the remaining haloalkylated sites. Preferably, substantially all remaining haloalkylated sites are substituted with the second tertiary amine.

The resins of the present invention are prepared by generally following conventional methods, except that it is important to functionalize the copolymer beads as previous described.

In general, the resins are prepared by functionalizing a copolymer bead matrix. The copolymer beads are normally prepared by suspension polymerization of a mixture which includes a monovinyl aromatic monomer like vinyl-benzyl chloride or styrene, a cross-linking monomer such as divinylbenzene, and an effective amount of a free-radical polymerization initiator. If the monovinyl aromatic monomer is vinyl-benzyl chloride, then the copolymer bead is already haloalkylated. If the monovinyl aromatic monomer is styrene, then the copolymer bead matrix is typically haloalkylated by reaction with a haloalkylation agent, typically chloromethylmethyl ether, in the presence of a Friedel-Crafts catalyst. The beads containing the haloalkyl groups are then partially aminated with a first tertiary amine. Thereafter, the beads are further aminated with a second tertiary amine.

Suspension polymerization methods are well-known in the art. Suitable methods include, for example, a single-stage polymerization process as described by F. Helfferich in *Ion Exchange*, supra, at pages 35–36, wherein a single monomer mixture is suspension polymerized to produce copolymer beads. Also suitable is a "seeded" or multi-staged polymerization process described, for example, in U.S. Pat. Nos. 4,419,245 and 4,564,644, the teachings of which are incorporated herein by reference.

The monomers employed are addition polymerizable monovinyl aromatic compounds and any addition polymerizable polyvinyl compound which may act as a cross-linking monomer. Such monomers are well-known in the art and reference is made to *Polymer Processes*, edited by Calvin E. Schildknecht, published in 1956 by Interscience Publishers, Inc., New York, Chapter III, the relevant teaches of which are incorporated by reference. Of particular interest are water-insoluble monomers including monovinyl aromatics such as styrene, vinyl naphthalene, alkyl-substituted styrenes (particularly monoalkyl-substituted styrenes such as vinyl-toluene and ethylvinylbenzene) and halo-substituted styrenes such as bromostyrene, chlorostyrene, or vinyl-benzylchloride, the polyvinyl aromatics such as divinylbenzene, divinyltoluene, divinylxylene, divinylnaphthalene, trivinylbenzene, divinyldiphenyl ether, and divinyldiphenylsulfone; and mixtures of one or more of the monomers. Preferred monomers include monovinyl aromatics like vinyl-benzyl chloride or styrene, or a mixture of styrene with a monoalkyl- or haloalkyl-substituted styrene derivative, and polyvinyl aromatics like divinylbenzene. The most preferred monomers are vinyl-benzyl chloride and divinylbenzene.

Copolymer beads are advantageously prepared from monomer mixtures having from about 60 to about 98 weight percent, based on the weight of monomers employed, of the monovinyl aromatic monomer with the balance of the mixture, i.e., from about 2 to about 40 weight percent, being a cross-linking monomer. Preferred copolymer beads have from about 90 to about 97 weight percent of the monovinyl aromatic monomer with from about 3 to about 10 weight percent being the cross-linking monomer.

A liquid diluent which is substantially inert under polymerization conditions may be incorporated into the monomer mixture to obtain macroporous copolymer beads. Suitable diluents, as known to those in the art, are organic liquids which are a solvent for the monomers employed, but a non-solvent for the resulting copolymer.

The term "macroporous" (also referred to as macroreticular) is widely used in the art and, in general, refers to copolymer beads which have regions of densely packed polymer chains exhibiting molecular-sized porosity which are separated by copolymer-free voids, often referred to as mesopores (50–200 Å) and macropores (>200 Å). In contrast, microporous, or gel-type, resins have pores generally of molecular-size (generally less than about 50 Å). Macroporous and gel resins are further described in U.S. Pat. Nos. 4,224,415 and 4,382,124, the teachings of which are incorporated herein by reference. Copolymer beads employed herein may be either macroporous or gel.

Haloalkylated copolymer beads may be obtained directly by copolymerizing monomers like vinyl-benzyl chloride with a cross-linking monomer.

Methods for haloalkylating copolymer beads are well-known. Illustrative of such are U.S. Pat. Nos. 2,642,417; 2,960,480; 2,597,492; 2,597,493; 3,311,602; 2,632,000; 2,632,001 and 2,992,544 and Helfferich, supra, at pages 52–53, all of which have been incorporated herein by reference. In general, the copolymer beads are preferably haloalkylated by swelling them with a haloalkylating agent and an effective amount of a Friedel-Crafts catalyst. Thereafter, the swollen copolymer beads are heated to a temperature sufficient to initiate reaction and the temperature is maintained until obtaining a desired degree of reaction. The copolymer beads are preferably halomethylated and most preferably chloromethylated.

In the process of using the novel resins disclosed herein, chemical species are separated from liquids by contact with the resin. The process is characterized by exchange kinetics which are improved in comparison to resins functionalized with only one type of amine. The term "exchange kinetics" as used herein refers to the rate at which the chemical species of interest are sorbed onto the resin.

Suitable methods for conducting the separation are those resulting in intimate contact between the liquid and the resin. Examples of suitable methods include fluidized beds, stirred tanks, batch tanks, and cocurrent or countercurrent flow columns. The contact may occur batchwise, semi-batchwise, continuously, or semi-continuously. Preferably, the liquid is contacted with the resin in a continuous system employing a packed ion-exchange column.

The time required for contact will depend upon numerous factors, such as the following: (1) the properties of the resin employed; (2) the amount of chemical species present in the liquid mixture; (3) the degree of separation desired; and (4) the amount of resin employed in the process. Thus, the time employed in most instances is more or less determined empirically.

The temperature at which the contact is conducted is one which does not adversely affect either the resin or the liquid being treated. In general, the temperature is limited only by the freezing point, boiling point, and viscosity of the liquid, as well as the temperature at which the components of the liquid or the resin itself begins to decompose. In general, temperatures from about 5° C. to about 80° C. are suitable.

This invention, in particular, involves the synthesis of an anion exchange resin useful for the removal of technetium (as the pertechnetate anion, $TcO_4^-$) from aqueous solutions containing dilute concentrations of anions and cations (such as sodium, potassium, calcium, nitrate, chloride, and sulfate) such as would be found in groundwater aquifers. The bifunctional resins of the present invention are prepared by first reacting the haloalkylated cross-linked copolymer beads (prepared, for example, from the polymerization of vinyl-benzene chloride with divinyl benzene cross-linker) with a large amine (e.g., trihexylamine) to the maximum degree possible to achieve high selectivity. It is preferred that this first tertiary amine has higher alkyl moieties. By higher alkyl we mean 5 or more carbons. Most preferred are alkyl moieties having 5 to 8 carbons. This material is then reacted with a second, smaller, tertiary amine (e.g., tripropylamine) to more fully functionalize the resin (functionalize the sites that were not accessible to the large tertiary amine), and increase the wettability of the resin and the overall exchange kinetics. It is preferred that the second tertiary amine has lower alkyl moieties. By lower we mean 1 to 4 carbons. The order of reaction is important, as the bulky amine reacts with the most accessible chloromethyl sites on the resin; the less accessible sites are then reacted with the smaller amine, which results in a resin with a high density of exchange sites.

The choice of liquid media in which the amination reaction is performed is also important. The solvent used should be one in which the polymer bead will swell, to allow the bulky amines to penetrate more deeply into the cross-linked polymer lattice for reaction with the haloalkylated reactive site. However, the solvent should not be one that could itself react with the haloalkylated reactive site. Examples of suitable solvents are 1,4-dioxane and ethylene dichloride.

Finally, the degree of cross-linking of the beads is important: too little and the beads will lack mechanical strength, and too much, and the transport kinetics will be too slow. The preferred weight percent cross-linking for the bifunctional resins is in the 5%–10% weight range. Although increasing the cross-linking also has the effect of enhancing the selectivity for pertechnetate over other anions (such as nitrate and chloride) a threshold is reached (dependent upon the tertiary amine) after which there is no further improvement and, in fact, the selectivity begins to erode.

Figure 2:
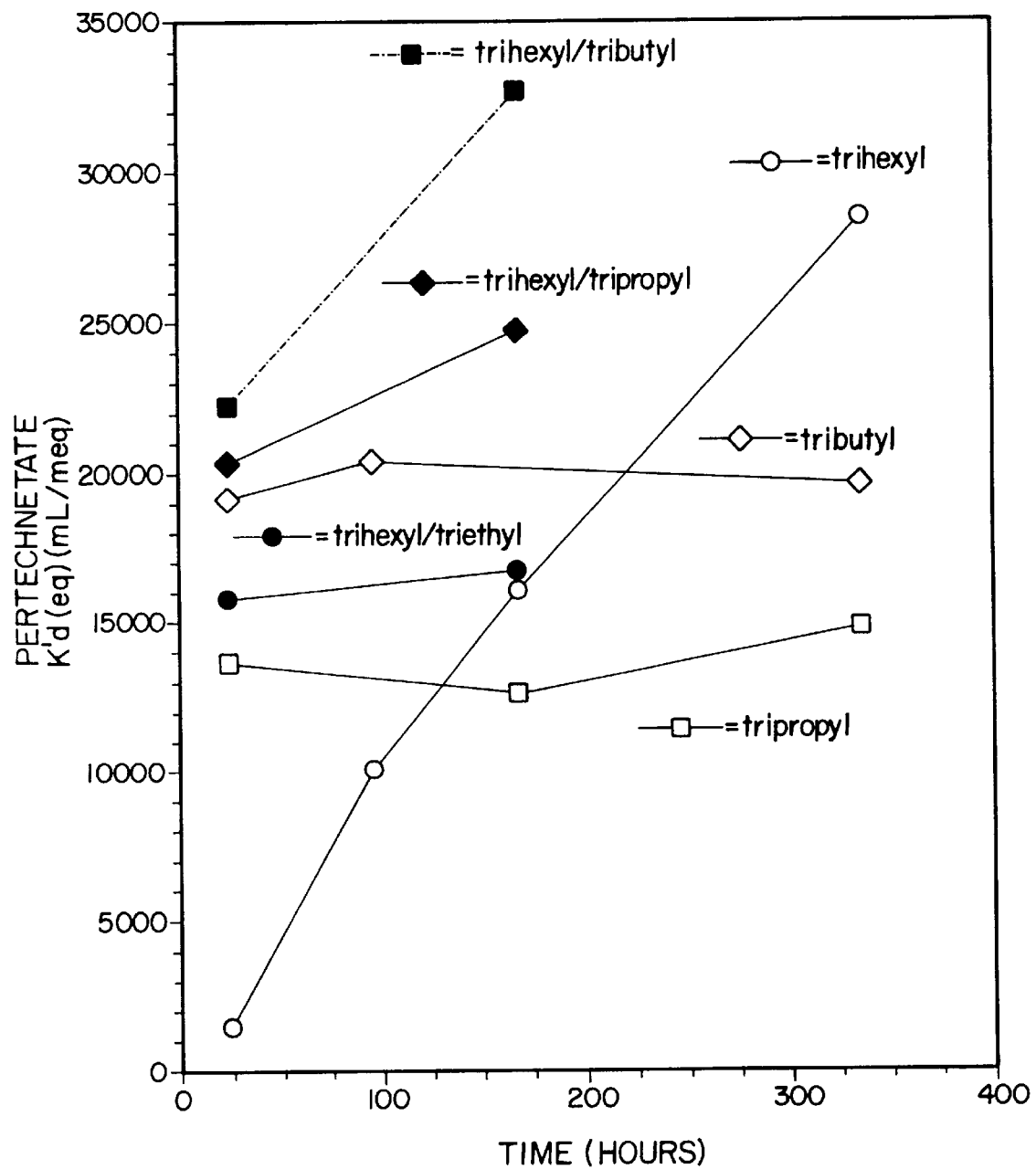
FIG. 2 shows technetium distribution $K'_d$ per exchange site $K'_d$ (eq) for bifunctional resins (combined exchange sites) and monofunctional resins as a function of time (uncertainty is ±3%).

For traditional anion exchange resins containing one type of tertiary amine, sorptive capacity for pertechnetate in a 24 hour period appears to reach a maximum when tributyl amine is the quaternizing amine, and the cross-link density is about 10%. As is shown in FIGS. 1 and 2, larger tertiary amines give higher selectivity, but at the cost of much slower exchange rates, and diminished capacity (thus while it is more selective for pertechnetate, the sorptive capacity per gram of resin decreases). In applications such as removing pertechnetate from groundwater, it is desirable to have a resin which has high selectivity, capacity, and favorable exchange kinetics for pertechnetate. For economic reasons, it pays to be able to sorb as much pertechnetate as possible into a given mass or volume of resin, in a practical amount of time. As is illustrated below, using two different tertiary amines to prepare the anion exchange sites on the resin (the first being a "large" tertiary amine to enhance selectivity, followed by a smaller amine to enhance the overall exchange capacity and exchange rate) results in a resin with superior selectivity and sorptive capacity in a given amount of time over resins having exchange sites prepared from only one tertiary amine.

The following examples are disclosed to illustrate the process of the invention and are not to be taken as limiting the scope of the invention. The first example details the synthesis of a specific anion exchange resin containing two different exchange sites by successive reaction of the precursor resin with first a large amine, and then a smaller amine (Example 1), and the remaining examples (Examples 2 and 3) illustrate the improved uptake of pertechnetate from a variety of aqueous solutions for different periods of time.

EXAMPLE 1

About 15 g of 5% divinylbenzene-crosslinked poly (vinylbenzyl chloride) macroporous copolymer beads (40–60 mesh cut) were contacted overnight with 100 mL dioxane. A solution of 76 mL trihexylamine, 125 mL dioxane and 5 mL water was then added and the mixture refluxed 17 hours. After amination, the beads were washed with dioxane, ethanol, ethanol/water, 4% HCl and water, then eluted with water, 4% NaOH, water, 4% HCl and water. The second amination was conducted as follows: 26.6 g of the above material (after filtering of the water) was refluxed 17 hours in a solution of 210 mL dioxane, 90 mL tripropylamine, and 10 mL water. The wash and elution sequence was as above. The resin beads had the following characteristics: total solids=41.8±1.2%; total anion exchange capacity=2.13 meq/gram; anion exchange capacity due to trihexylamine site: 0.99 meq/gram; anion exchange capacity due to tripropylamine site: 1.14 meq/gram. All aminations and formation of bifunctional polymers followed the sequence outlined for this resin.

COMPARATIVE EXAMPLE 2

This example demonstrates the removal of technetium as pertechnetate from dilute salt solutions. Sorption of pertechnetate was measured by exposing samples (shaken in 250 mL Teflon bottles) of moist resin (approximately 200 mg dry weight) to known volumes (e.g., 100 mL) of test solution containing pertechnetate ($^{99}TcO_4^-$) at six micromolar in concentration in an electrolyte matrix containing sodium chloride, sodium nitrate, and sodium sulfate, each at 60 millimolar, for a given period of time (e.g., 24 hours). These concentrations are about two-to-three orders of magnitude higher than those encountered in contaminated groundwater, and is thus a more severe test. The ratio of the concentrations of the other ions to pertechnetate is similar to the concentration ratio encountered in actual groundwater (typically 10,000 to 100,000).

The technetium-99 activity remaining in the solution after the exposure period to the resin was then assayed using standard liquid scintillation counting techniques. The amount of Tc sorbed onto the resin was determined by subtracting the Tc activity in the solution following the exposure period from the total Tc activity in the starting solution. The distribution ratio $K'_d$ in mL/g was determined as shown in the equation below, in a manner similar to that described by Ashley, et al. (Ashley, K. R., et al., *Solv. Extr. Ion. Exch.* 12:239, 1994):

$$K'_d = \frac{\frac{[(Tc^{99}\ dpm)_{total} - (Tc^{99}\ dpm)_{solution}]}{g\ resin}}{\frac{(Tc^{99}\ dpm)_{solution}}{mL\ solution}} = \frac{\frac{mmol\ TcO_4^-}{1\ gram\ of\ dry\ resin}}{\frac{mmol\ TcO_4^-}{1\ mL\ of\ solution}}$$

An alternative ratio $K'_d(eq)$ in mL/meq was calculated by dividing $K'_d$ by the total anion exchange capacity (TAEC) of the particular resin. The $K'_d$ value provides a measure of the sorptive ability for technetium per gram of resin, and $K'_d(eq)$ provides a measure of the relative affinity per exchange site for technetium.

Typical results for pertechnetate sorption (by the bifunctional resin of the invention) over a 24 hour period are shown below in Table 1, along with the sorption results for selected mono-functionalized resins (one tertiary amine employed) for comparison. It can be seen that superior $K'_d$ values can be obtained over monofunctional resins when large tertiary amines such as tri-n-hexyl amine are combined with small tertiary amines such as triethyl amine or tri-n-propyl amine to form the bifunctional resins. In fact, with the exception of the trihexyl/trimethyl combination (Table 1, in which the overall pertechnetate sorptive strength of the resin is dominated by the low-pertechnetate selective trimethyl functionality), the bifunctional resins exhibit superior 24 hour $K'_d$ values compared to all the monofunctional resins tested. The improved $K'_d$ values arise from a combination of both increased sorptive capacity per exchange site ($K'_d(eq)$), an indication of selectivity), as well as high (>1.7 meq/g) overall exchange capacity.

TABLE 1

Sorption results for pertechnetate from Groundwater Test Solution (24 hour equilibration times) for selected synthetic and commercial anion exchange resins. $K'_d$ and $K'_d(eq)$ values have an uncertainty of ± 3%

| Tertiary amine #1 (meq/g) | Tertiary amine #2 (meq/g) | Ratio amine #1 to amine #2 | Total anion exchange capacity (meq/g) | Percent DVB Cross-linking | $K'_d$ (mL/g) (24 hr) | $K'_d(eq)$ (mL/meq total capacity) (24 hr) |
|---|---|---|---|---|---|---|
| trihexyl (0.70) | trimethyl (2.50) | 0.28 | 3.20 | 5 | 13180 | 4120 |
| trihexyl (1.18) | triethyl (1.18) | 1.00 | 2.36 | 5 | 37320 | 15810 |
| trihexyl (0.99) | tripropyl (1.14) | 0.87 | 2.13 | 5 | 43260 | 20310 |
| trihexyl (1.18) | tributyl (0.58) | 2.03 | 1.76 | 5 | 39180 | 22260 |
| tri-(iso-octyl) (0.70) | tripropyl (1.24) | 0.56 | 1.94 | 5 | 37770 | 19470 |
| Comparative Examples | | | | | | |
| trimethyl | none | NA | 3.77 | 10 | 6350 | 1690 |
| triethyl | none | NA | 2.84 | 10 | 16150 | 5690 |
| tripropyl | none | NA | 2.58 | 5 | 20270 | 7860 |
| tripropyl | none | NA | 1.70 | 10 | 23220 | 13660 |
| tripropyl | none | NA | 1.58 | 15 | 20350 | 12880 |
| tributyl | none | NA | 1.66 | 10 | 31750 | 19130 |
| trihexyl | none | NA | 1.02 | 5 | 9030 | 8850 |
| trihexyl | none | NA | 0.98 | 10 | 1540 | 1570 |

COMPARATIVE EXAMPLE 3

This example illustrates the removal of technetium as pertechnetate from dilute salt solutions via batch equilibrium sorption studies as a function of time. In this example, the same conditions were employed as described above in Example 2, with the addition that the exposure time was extended to at least one week, and in some cases longer, for selected resins.

FIG. 1 illustrates the higher $K'_d$ achieved from the bifunctional resins as compared to the mono-functionalized resins, with the trihexyl/tripropyl resin providing the best sorptive capacity per gram for a 24 hour period. The tripropyl, tributyl, and trihexyl/triethyl resins do not show much substantial improvement in the $K'_d$ values upon longer exposure time (one week). FIG. 2 is especially illuminating, as it illustrates the increase in $K'_d$ per exchange site for the trihexyl aminated resin over time. It takes a long time (>300 hours), but the $K'_d(eq)$, an indication of selectivity, becomes very high for the trihexyl amine. It was this observation that propelled the surprising and unexpected discovery that a blending of the trihexyl amine (which delivers exceptional pertechnetate activity) with a smaller tertiary amine such as tripropyl (which develops its maximum capacity much more quickly) provides a resin with superior sorptive capacity and selectivity in a shorter period of time. As can be seen from FIGS. 1 and 2, this is indeed the case. Combining the two different tertiary amines in a unique way results in resins with superior short term sorption of pertechnetate.

POSSIBLE ALTERNATIVE VERSIONS

The anion exchange resins having the chemical composition described in the invention can be prepared in a variety of physical forms that allow increased access of solution to the exchange sites. The preferred embodiment of this invention is in the form of macroporous beads, but the use of a solvent swollen gel or other form may be advantageous in some circumstances.

The resins covered by this invention were specifically designed to selectively sorb Tc in the form of the pertechnetate anion from groundwater. The resins will also find utility for the sorption of Tc from other matrices such as tank waste where nitrate ion is present at extremely high concentrations. The resins will also be useful for the selective sorption of other poorly hydrated, singly charged anions from solution. This group of anions includes iodide, perchlorate, perrhenate, and other perhalate anions.

We claim:

1. A process of preparing bifunctional anion-exchange resins comprising the steps of:

reacting haloalkylated, cross-linked copolymer beads with a first tertiary amine under conditions and in an amount sufficient to substitute at least a portion of the haloalkylated sites and obtain partially functionalized copolymer beads, wherein the first tertiary amine has higher alkyl moieties; and reacting the partially functionalized copolymer beads with a second tertiary amine under conditions and in an amount sufficient to functionalize at least a portion of the remaining haloalkylated sites, wherein the second tertiary amine has lower alkyl moieties.

2. The process of claim 1, wherein the first tertiary amine corresponds to the formula $NR_1R_2R_3$ and wherein the second tertiary amine corresponds to the formula $NR_4R_5R_6$, where $R_1$, $R_2$, and $R_3$ are independently selected from alkyl moieties having 5 or more carbons and $R_4$, $R_5$, and $R_6$ are independently selected from alkyl moieties having 1 to 4 carbons.

3. The process of claim 2, wherein $R_1$, $R_2$, and $R_3$ are independently selected from alkyl moieties having 5 to 8 carbons.

4. The process of claim 3, wherein the first tertiary amine is selected from the group consisting of tri-n-pentyl amine, tri-n-hexyl amine, tri-n-heptyl amine, and tri (iso-octyl) amine and the second tertiary amine is selected from the group consisting of trimethyl amine, triethyl amine, tri-n-propyl amine, tri-n-butyl amine, and tri (isobutyl) amine.

5. The process of claim 4, wherein the anion exchange capacity of the first tertiary amine is about 0.3 to about 1.8 meq/g dry weight of resin, and the anion exchange capacity of the second tertiary amine is about 0.3 to about 3.0 meq/g dry weight of resin.

6. The process of claim 3, wherein the first tertiary amine is selected from the group consisting of tri-n-pentyl and tri-n-hexyl amine and the second tertiary amine is selected from the group consisting of triethyl amine, tri-n-propyl amine, tri-n-butyl amine, and tri (isobutyl) amine.

7. The process of claim 6, wherein the anion exchange capacity of the first tertiary amine is about 0.7 to about 1.3 meq/g dry weight of resin, and the anion exchange capacity of the second tertiary amine is about 0.7 to about 2.5 meq/g dry weight of resin.

8. The process of claim 3, wherein the first tertiary amine is tri-n-hexyl amine and the second tertiary amine is selected from the group consisting of triethyl amine and tri-n-propyl amine.

9. The process of claim 8, wherein the anion exchange capacity of the first tertiary amine is about 0.8 to about 1.2 meq/g dry weight of resin, and the anion exchange capacity of the second tertiary amine is about 1.0 to about 2.3 meq/g dry weight of resin.

10. The process of claim 1, wherein the cross-linked copolymer beads are chloromethylated.

11. The process of claim 1, wherein the copolymer beads are macroporous.

12. The process of claim 1, wherein the copolymer beads are a gel copolymer.

13. The process of claim 1, wherein the copolymer beads comprise from about 90 to about 97 weight percent of a monovinyl aromatic monomer and from about 3 to about 10 weight percent of a cross-linking monomer based on the weight of the monomers.

14. The process of claim 13, wherein the monovinyl aromatic monomer is selected from the group consisting of styrene and vinyl-benzyl chloride, and the cross-linking monomer is divinylbenzene.

15. The process of claim 14, wherein the monovinyl aromatic monomer is vinyl-benzyl chloride.

16. The process of claim 1, comprising the further step of first contacting the cross-linked copolymer beads with a solvent capable of swelling the cross-linked copolymer beads.

17. The process of claim 16, wherein the solvent is selected from the group consisting of dioxane and ethylene dichloride.

18. The process of claim 1, wherein the reacting steps are conducted in a solvent capable of swelling the cross-linked copolymer beads.

19. The process of claim 18, wherein the solvent is selected from the group consisting of dioxane and ethylene dichloride.

20. A bifunctional anion-exchange resin comprising haloalkylated, cross-linked polymer beads in which a first tertiary amine having higher alkyl moieties is substituted at haloalkylated sites which are most accessible to said first amine and in which a second tertiary amine having lower alkyl moieties is substituted at haloalkylated sites which are least accessible to said first amine.

21. The resin of claim 20, wherein the first tertiary amine corresponds to the formula $NR_1R_2R_3$ and wherein the second tertiary amine corresponds to the formula $NR_4R_5R_6$, where $R_1$, $R_2$, and $R_3$ are independently selected from alkyl moieties having 5 or more carbons and $R_4$, $R_5$, and $R_6$ are independently selected from alkyl moieties having 1 to 4 carbons.

22. The resin of claim 21, wherein $R_1$, $R_2$ and $R_3$ are independently selected from alkyl moieties having 5 to 8 carbons.

23. The resin of claim 22, wherein the first tertiary amine is selected from the group consisting of tri-n-pentyl amine, tri-n-hexyl amine, tri-n-heptyl amine, and tri (iso-octyl) amine and the second tertiary amine is selected from the group consisting of trimethyl amine, triethyl amine, tri-n-propyl amine, tri-n-butyl amine, and tri (isobutyl) amine.

24. The resin of claim 23, wherein the anion exchange capacity of the first tertiary amine is about 0.3 to about 1.8 meq/g dry weight of resin, and the anion exchange capacity of the second tertiary amine is about 0.3 to about 3.0 meq/g dry weight of resin.

25. The resin of claim 22, wherein the first tertiary amine is selected from the group consisting of tri-n-pentyl and tri-n-hexyl amine and the second tertiary amine is selected from the group consisting of triethyl amine, tri-n-propyl amine, tri-n-butyl amine, and tri (isobutyl) amine.

26. The resin of claim 25, wherein the anion exchange capacity of the first tertiary amine is about 0.7 to about 1.3 meq/g dry weight of resin, and the anion exchange capacity of the second tertiary amine is about 0.7 to about 2.5 meq/g dry weight of resin.

27. The resin of claim 22, wherein the first tertiary amine is tri-n-hexyl amine and the second tertiary amine is selected from the group consisting of triethyl amine and tri-n-propyl amine.

28. The resin of claim 27, wherein the anion exchange capacity of the first tertiary amine is about 0.8 to about 1.2 meq/g dry weight of resin, and the anion exchange capacity of the second tertiary amine is about 1.0 to about 2.3 meq/g dry weight of resin.

29. The resin of claim 20, wherein the cross-linked copolymer beads are chloromethylated.

30. The resin of claim 20, wherein the copolymer beads are macroporous.

31. The resin of claim 20, wherein the copolymer beads are a gel copolymer.

32. The resin of claim 20, wherein the copolymer beads comprise from about 90 to about 97 weight percent of a monovinyl aromatic monomer and from about 3 to about 10 weight percent of a cross-linking monomer based on the weight of the monomers.

33. The resin of claim 32, wherein the monovinyl aromatic monomer is selected from the group consisting of styrene and vinyl-benzyl chloride, and the cross-linking monomer is divinylbenzene.

34. The resin of claim 33, wherein the monovinyl aromatic monomer is vinyl-benzyl chloride.

35. A process for separating chemical species from a liquid which contains the chemical species in solution comprising the steps of:
  contacting the liquid with the resin of claim 20 such that the chemical species are retained thereby; and
  eluting the chemical species from the resin with a regenerating agent.

36. The process of claim 35, wherein the chemical species are pertechnetate ions.

37. The process of claim 35, wherein the chemical species are perchlorate ions.

38. The process of claim 35, wherein the chemical species are perrhenate ions or iodide.

* * * * *